United States Patent
Lin et al.

(10) Patent No.: US 10,025,058 B2
(45) Date of Patent: Jul. 17, 2018

(54) GAP COMPENSATION MECHANISM FOR SELF ADAPTIVE POSTURE ADJUSTMENT

(71) Applicant: National Applied Research Laboratories, Taipei (TW)

(72) Inventors: Wei-Cheng Lin, Taipei (TW); Shenq-Tsong Chang, Hsinchu (TW); Hsu-Pin Pan, Hsinchu (TW); Ting-Ming Huang, Hsinchu (TW); Shih-Feng Tseng, Hsinchu County (TW)

(73) Assignee: NATIONAL APPLIED RESERACH LABORATORIES, Taipei (TW)

( * ) Notice: Subject to any disclaimer, the term of this patent is extended or adjusted under 35 U.S.C. 154(b) by 816 days.

(21) Appl. No.: 14/512,591

(22) Filed: Oct. 13, 2014

(65) Prior Publication Data
US 2016/0103293 A1    Apr. 14, 2016

(51) Int. Cl.
*G02B 7/00* (2006.01)
*G02B 7/02* (2006.01)

(52) U.S. Cl.
CPC ............. *G02B 7/003* (2013.01); *G02B 7/025* (2013.01); *G02B 7/026* (2013.01)

(58) Field of Classification Search
CPC ....... B23Q 1/545; E06B 1/6069; G02B 7/003; G02B 7/026; G02B 7/025
USPC ........................................................ 269/289
See application file for complete search history.

(56) References Cited

U.S. PATENT DOCUMENTS

| 2,657,596 | A | * | 11/1953 | De Armas | B28D 1/143 269/269 |
| 4,381,104 | A | * | 4/1983 | Nelsen | A63H 27/02 269/101 |
| 5,522,569 | A | * | 6/1996 | Steffy | B64G 1/002 136/245 |
| 5,822,133 | A | * | 10/1998 | Mizuno | G02B 3/14 250/491.1 |
| 6,750,947 | B1 | * | 6/2004 | Tomita | G02B 7/026 355/52 |
| 7,704,304 | B2 | * | 4/2010 | Warren | B01D 53/0407 96/114 |
| 2009/0060753 | A1 | * | 3/2009 | Jones | A61M 1/1081 417/46 |
| 2009/0219433 | A1 | * | 9/2009 | Higuchi | G02B 7/025 348/340 |

(Continued)

*Primary Examiner* — Christopher M Koehler
*Assistant Examiner* — Joel Crandall
(74) *Attorney, Agent, or Firm* — Jackson IPG PLLC; Demian K. Jackson

(57) ABSTRACT

A gap compensation mechanism capable of self adaptive posture adjustment is disclosed, which comprises a base seat, having at least a fixation portion disposed thereon, the fixation portion having a flow path area disposed peripheral thereto; at least an adjustment unit, sleeved onto an outer rim of the fixation portion; and a filler, being filled within the flow path area. As such, a workpiece to be fixed may be disposed on a face of an adjustment unit. Further, the adjustment unit provides at least three freedoms for the altitude and two axial inclinations for self adaptively compensating a gap with any geometrical shapes and thus further adjusting the posture of the combined workpiece. After all the adjustments, a filler is filled to reinforce the structure and finally a fixation unit is employed for locking and fixing.

6 Claims, 3 Drawing Sheets

(56) References Cited

U.S. PATENT DOCUMENTS

2010/0110570 A1\* 5/2010 Blanding ............... G02B 7/023
    359/824
2013/0126406 A1\* 5/2013 Alqanee ................... E03F 5/10
    210/163

\* cited by examiner

GAP COMPENSATION MECHANISM FOR SELF ADAPTIVE POSTURE ADJUSTMENT

FIELD OF THE INVENTION

The present invention relates to a gap compensation mechanism for self adaptive posture adjustment, and particularly to a gap compensation mechanism for self adaptive posture adjustment, capable of avoiding from a concentrated stress resulted from locking and fixation and an additional processing with respect to a gap, whereby the efficacy of a simple structure, easy use, accurate adjustment and improved structural strength may be achieved.

DESCRIPTION OF THE RELATED ART

To meet the demands for quality of precision mechanics and optical system assembly, a precision insert is required to be used for gap compensation or altitude adjustment. A conventional mechanism for this is shown in FIG. 3, where a wedge insert 8 is disposed between a base seat 6 and a workpiece 7 to be fixed, and a screw 9 is used to lock and thus fix the workpiece 7, the insert 8, and the base seat 6 from the workpiece 7 side, thereby completing the assembly of the mechanism.

However, only the insert 8 is used for adjustment between the workpiece 7 and the base seat 6, and the issues are thus risen where a poor co-planar extent of the fixation planes is presented, causing the concentrated stress in the course of locking and fixing, and the insert 8 at some particular gaps has to be additionally polished, resulting in a complex fabricating process in use.

Now, the case where a main lens is assembled is considered. The assembly process of the main lens is conducted by gluing an iso-static mount and the main lens the main lens together and then locking fixing the iso-static mount onto a main plate, and thus the mentioned coplanar extent and thus the concentrated stress issues arises and the stress is transmitted to the main lens. This results in a deformity of the main lens.

To solve all the demerits above for the conventional mechanism, the inventor of the present invention sets forth a gap compensation mechanism for self adaptive adjustment to effectively address the associated problems.

SUMMARY OF THE INVENTION

It is, therefore, an object of the present invention to provide a gap compensation mechanism for self adaptive posture adjustment, where a workpiece to be fixed may be disposed on a face of an adjustment unit, so that the workpiece and the adjustment unit may reach together a close bonding state for their contact faces. Further, the adjustment unit provides at least three freedoms for the altitude and two axial inclinations for self adaptively compensating a gap with any geometrical shapes and thus further adjusting the posture of the combined workpiece.

After all the adjustments, a filler is filled to reinforce the structure and finally a fixation unit is employed for locking and fixing. Therefore, except for exemption of a concentrated stress owing to the locking and fixing, it may be exempted from an additional processing for some particular gaps, whereby the efficacies of a simple structure, easy operational use, accurate adjustment and improved structural strength may be achieved.

To achieve the above object, the gap compensation mechanism capable of self adaptive posture adjustment according to the present invention comprises a base seat, having at least a fixation portion disposed thereon, the fixation portion having a flow path area disposed peripheral thereto; at least an adjustment unit, sleeved onto an outer rim of the fixation portion; and a filler, being filled within the flow path area.

In an embodiment, the fixation portion is a threaded sleeve.

In an embodiment, the adjustment unit comprises a resilient element, a stacker disposed on the resilient element, and an adjustment element disposed on the stacker.

In an embodiment, the resilient element includes a compression spring, a disk-like spring, and a wave-like spring.

In an embodiment, each of the stacker and the adjustment element has an indented arc face on an opposed face thereof.

In an embodiment, the adjustment element has a curved arc face corresponding to the indented arc face on a face thereof and a planar portion on the other face.

In an embodiment, the fixation unit is a screw threaded into the fixation portion.

In an embodiment, the filler is selected from a group consisting of EC 2216, DP 490, liquid shim, and EA 9394.

BRIEF DESCRIPTIONS OF THE DRAWINGS

DESCRIPTION OF THE PREFERRED EMBODIMENTS

Figure 1:
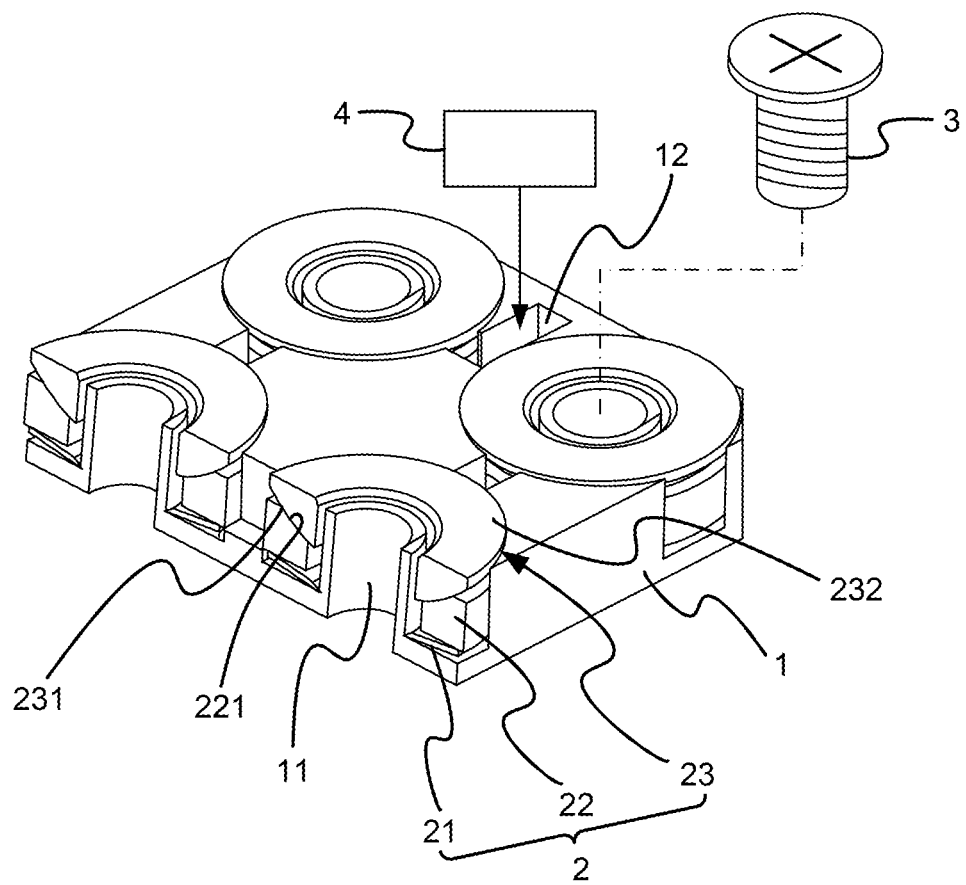
FIG. 1 is a schematic diagram of a n outlook according to the present invention.
Figure 2:
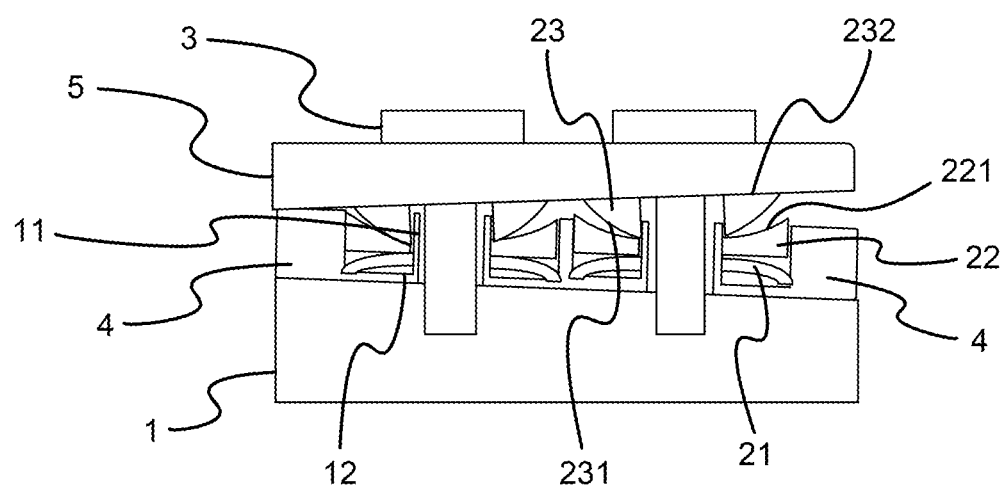
FIG. 2 is a schematic diagram of a use state according to the present invention.
Figure 3:
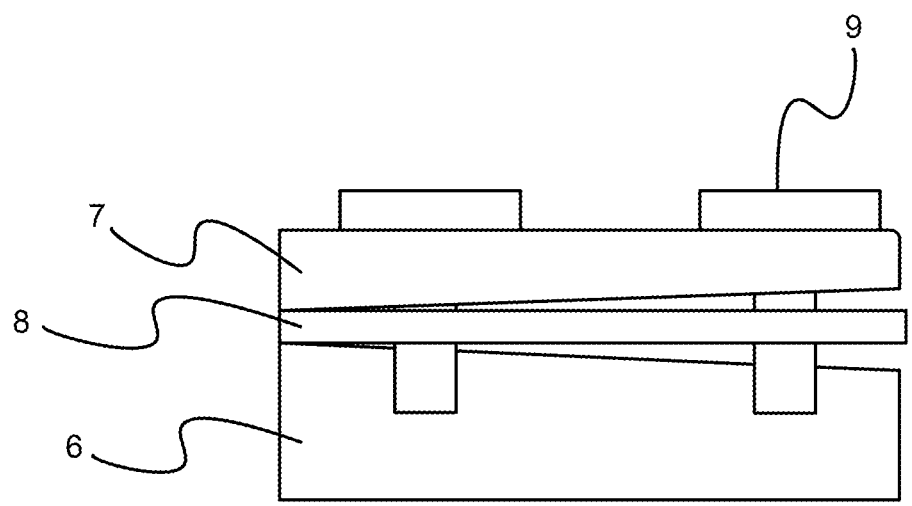
FIG. 3 is a schematic diagram of a use state of the prior art.

Referring to FIG. 1 and FIG. 2, a schematic diagram of a n outlook according to the present invention, a schematic diagram of a use state according to the present invention. As shown, the gap compensation mechanism for self adaptive posture adjustment comprises a base seat 1, at least an adjustment unit 2, at least a fixation unit 3, and a filler 4.

In a preferred embodiment, four adjustment units 2 and fixation units 3 are disposed on the base seat 1. However, this is merely an example, without limiting the present invention. It may also provide one to four sets or more of the adjustment units 2 and the fixation units 3 for the real use.

Above the base seat 1, at least one fixation portion 11 is disposed, and four is adopted in this embodiment in coordination with the four adjustment units 2. Each of the fixation portions 11 is a threaded sleeve. Peripheral to each of the fixation portions 11, a flow path area 12 is disposed.

Each of the adjustment unit 2 is sleeved onto an outer rim of each of the fixation portions 11. Each of the adjustment units 2 comprises a resilient element 21, a stacker 22 disposed on the resilient element 21, and an adjustment element 23 disposed on the stacker 22. The resilient element 21 s a compression spring, a disk-like spring, or a wave-like spring.

The stacker 22 has an indented arc face 221 on a face opposed to the adjustment element 23. The adjustment element 23 has a curved arc face 231 corresponding to the indented arc face 221 on its face opposed to the indented arc face 221, and has a planar portion 232 on the other face.

Each of the fixation units 3 is combined with a corresponding one of the fixation portions 11, and is a screw threaded into each of the fixation portions 11, respectively.

The filler 4 is filled within the flow path area 12, and is EC 2216, DP 490, liquid shim, or EA 9394.

When the present invention operates, the workpiece 5 to be fixed is disposed on the planar portion 232 of each of the adjustment elements 23. Furthermore, the resilient element 21 provides an inverse force. The planar portion 232 of the adjustment element is combined with the workpiece 5 posture in a self adaptive manner to reach a close bonding state between their contact faces. Thereafter, by means of the inverse force of each of the fixation units 3 and the resilient element 21, the indented arc face 221 of the stacker 22 and the curved arc face 231 of the adjustment element 23 are used together to adjust the posture of the combined workpiece 5. When the workpiece is completed with its posture adjustment, a filler 4 is filled into the flow path area 12 for structural reinforcement. Furthermore, after the filler 4 is solidified, each of the fixation units 3 and the fixation portions 11 are closely locked together. In this manner, the gap compensation mechanism for self adaptive posture adjustment may be used to complete the assembly of the workpiece 5.

Since the present invention in operation provides at least three freedoms, including an altitude and two axial Inclinations, to self adaptively compensating a gap of any geometrical shapes by using the resilient elements 21 of the adjustment unit 2, stackers 22, and the adjustment elements 23 together. It may exempt from a complex fabricating process for polishing a wedge insert with respect to some particular gaps except that a concentrated stress in the course of locking due to a poor coplanar degree of the locked planes. Further, the structural strength may be simultaneously secured. When the present invention is used in the application of assembly of an optical system, the reverse effect of the structural concentrated stress on deformity of the optical element may be exempted.

In view of the above, the gap compensation mechanism for self adaptively posture adjustment of the present invention may effectively improve demerits of the prior art. A workpiece to be fixed may be disposed on a face of the adjustment unit, so that the workpiece and the adjustment unit may reach together a close bonding state for their contact faces. Further, the adjustment unit provides at least three freedoms for the altitude and two axial inclinations for self adaptively compensating a gap with any geometrical shapes and thus further adjusting the posture of the combined workpiece.

After the posture adjustment is completed, the filler is filled for structural reinforcement and the fixation units are finally used to lock and fix. In this manner, except for exemption of the concentrated stress owing to the locking and fixing, it may be exempted from an additional processing for some particular gaps, whereby the efficacies of a simple structure, easy operational use, accurate adjustment and improved structural strength may be achieved.

From all these views, the present invention may be deemed as being more effective, practical, useful for the consumer's demand, and thus may meet with the requirements for a patent.

The above described is merely examples and preferred embodiments of the present invention, and not exemplified to intend to limit the present invention. Any modifications and changes without departing from the scope of the spirit of the present invention are deemed as within the scope of the present invention. The scope of the present invention is to be interpreted with the scope as defined in the claims.

What is claimed is:

1. A gap compensation mechanism capable of self adaptive posture adjustment, comprising:
   a base seat, having at least a fixation portion disposed thereon, the fixation portion having a flow path area disposed peripheral thereto,
      wherein the fixation portion includes a fixation unit in the form of a screw threaded into the fixation portion;
   at least an adjustment unit, sleeved onto an outer rim of the fixation portion,
      wherein the adjustment unit comprises a resilient element, a stacker disposed on the resilient element, and an adjustment element disposed on the stacker; and
   a filler, being filled within the flow path area.

2. The gap compensation mechanism capable of self adaptive posture adjustment as claimed in claim 1, wherein the fixation portion is a threaded sleeve.

3. The gap compensation mechanism capable of self adaptive posture adjustment as claimed in claim 1, wherein the resilient element includes a compression spring, a disk-like spring, and a wave-like spring.

4. The gap compensation mechanism capable of self adaptive posture adjustment as claimed in claim 1, wherein each of the stacker and the adjustment element has an indented arc face on an opposed face thereof.

5. The gap compensation mechanism capable of self adaptive posture adjustment as claimed in claim 4, wherein the adjustment element has a curved arc face corresponding to the indented arc face on a face thereof and a planar portion on the other face.

6. The gap compensation mechanism capable of self adaptive posture adjustment as claimed in claim 1, wherein the filler is selected from a group consisting of EC 2216, DP 490, and EA 9394.

* * * * *